(12) United States Patent
Jin et al.

(10) Patent No.: US 12,173,635 B2
(45) Date of Patent: Dec. 24, 2024

(54) AFTERTREATMENT HEATER MANAGEMENT FOR EFFICIENT THERMAL MANAGEMENT

(71) Applicant: Cummins Inc., Columbus, IN (US)

(72) Inventors: Xing Jin, Columbus, IN (US); Janardhan Kodavasal, Indianapolis, IN (US); Ved Merchant, Columbus, IN (US); Sriram S. Popuri, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 187 days.

(21) Appl. No.: 18/083,156

(22) Filed: Dec. 16, 2022

(65) Prior Publication Data

US 2023/0193798 A1 Jun. 22, 2023

Related U.S. Application Data

(60) Provisional application No. 63/290,847, filed on Dec. 17, 2021.

(51) Int. Cl.
*F01N 3/00* (2006.01)
*F01N 3/20* (2006.01)

(52) U.S. Cl.
CPC .... *F01N 3/2006* (2013.01); *F01N 2900/0414* (2013.01); *F01N 2900/0418* (2013.01);
(Continued)

(58) Field of Classification Search
CPC ........... F01N 3/2006; F01N 2900/0414; F01N 2900/0418; F01N 2900/08; F01N 2900/1411; F01N 2900/1602; F01N 2900/1621; F01N 2560/06; F01N 3/2066; F01N 9/002; F01N 3/027; F01N 2240/16; F01N 2900/0602; F01N 2900/10;
(Continued)

(56) References Cited

U.S. PATENT DOCUMENTS 5,695,722 A * 12/1997 Myers ...................... H05B 3/10
422/174
9,371,760 B2 6/2016 Hirth et al.
(Continued)

FOREIGN PATENT DOCUMENTS

EP 3 192 991 B1 7/2017

*Primary Examiner* — Matthew T Largi
(74) *Attorney, Agent, or Firm* — Foley & Lardner LLP

(57) ABSTRACT

A system, method, and apparatus for decreasing harmful emissions is provided. The system includes an aftertreatment system comprising an exhaust conduit that directs exhaust gas from an engine system; a heater coupled to the aftertreatment system and configured to provide heat; and a controller coupled to the heater. The controller is configured to: determine whether the engine system is idling; in response to determining that the engine system is idling, determine whether a conversion efficiency of the engine system is greater than a threshold value; in response to determining that the conversion efficiency is greater than the threshold value, determine whether a temperature regarding the aftertreatment system is greater than a threshold temperature; and in response to determining that the temperature of the aftertreatment system is greater than the threshold temperature, at least one of disable or partially disable the heater.

20 Claims, 4 Drawing Sheets

(52) U.S. Cl.
CPC ... *F01N 2900/08* (2013.01); *F01N 2900/1411* (2013.01); *F01N 2900/1602* (2013.01); *F01N 2900/1621* (2013.01)

(58) Field of Classification Search
CPC ............ F01N 2900/104; F01N 3/2013; F01N 2900/12; F01N 2900/1404; F01N 9/00
See application file for complete search history.

(56) References Cited

U.S. PATENT DOCUMENTS

| | | |
|---|---|---|
| 9,388,722 B2 | 7/2016 | Gonze et al. |
| 9,879,580 B2 * | 1/2018 | Gupta ................. F01N 13/0093 |
| 10,508,582 B2 * | 12/2019 | Hall ................... B01D 53/9418 |
| 2011/0000194 A1 * | 1/2011 | Gonze .................... F01N 3/103 60/297 |
| 2017/0211493 A1 * | 7/2017 | Kidd .................... F02D 41/025 |
| 2018/0258873 A1 * | 9/2018 | Haas .................. F02D 41/3005 |
| 2018/0313244 A1 | 11/2018 | Zhang et al. |
| 2022/0025797 A1 * | 1/2022 | Tolley .................... F01N 3/021 |
| 2022/0381204 A1 * | 12/2022 | Peters .................... F02D 23/00 |
| 2024/0035426 A1 * | 2/2024 | Gokhale ................ F01N 11/00 |

* cited by examiner

AFTERTREATMENT HEATER MANAGEMENT FOR EFFICIENT THERMAL MANAGEMENT

CROSS-REFERENCE TO RELATED APPLICATION

This application claims priority to and the benefit of U.S. Provisional Application No. 63/290,847, filed Dec. 17, 2021, which is incorporated herein by reference in its entirety.

TECHNICAL FIELD

The present disclosure relates generally to reducing harmful emissions from an engine

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply.

In this regard, exhaust gas may contain harmful constituents (e.g., nitrous oxides (NOx), sulfur oxides, particulate matter, etc.). Accordingly, the use of exhaust aftertreatment systems with engines to reduce harmful emissions is increasing. Exhaust aftertreatment systems may contain one or more catalysts that react with the exhaust gas to convert the harmful constituents to less harmful elements that are then released to the environment. Increasing catalytic activity is therefore important in reducing the amount of harmful emissions. Increasing catalytic activity may be achieved by, for example, increasing a temperature of the catalyst using a heater. Increasing catalyst temperature may promote intended operation of the catalyst (e.g., reducing NOx to less harmful compounds). However, operating a heater increases a load placed on the engine, which also increases the amount of harmful constituents in the exhaust gas.

SUMMARY

One embodiment relates to a system for decreasing harmful emissions. The system includes an aftertreatment system comprising an exhaust conduit that directs exhaust gas from an engine system; a heater coupled to the aftertreatment system and configured to provide heat; and a controller coupled to the heater. The controller is configured to: determine whether the engine system is idling; in response to determining that the engine system is idling, determine whether a conversion efficiency of the engine system is greater than a threshold value; in response to determining that the conversion efficiency is greater than the threshold value, determine whether a temperature regarding the aftertreatment system is greater than a threshold temperature; and in response to determining that the temperature of the aftertreatment system is greater than the threshold temperature, at least one of disable or partially disable the heater.

In one embodiment, the controller is configured to disable the heater. The controller may be configured to enable the heater in response to determining that the conversion efficiency is less than the threshold value. The controller may also be configured to enable the heater in response to determining that the temperature of the aftertreatment system is lower than the threshold temperature. In one embodiment, determining whether the engine system is idling includes determining whether a vehicle associated with in the engine system is stopped for a predetermined amount of time. In one embodiment, the controller may be configured to partially disable the heater based on look ahead information. In one embodiment, the look ahead information comprises at least one of an upcoming road grade or an upcoming ambient temperature.

Another embodiment relates to a method. The method may decrease harmful emissions from an engine system. The method includes: determining, by a controller, whether the engine system is idling; in response to determining that the engine system is idling, determining, by the controller, whether a conversion efficiency of the engine system is greater than a threshold value; in response to determining that the conversion efficiency is greater than the threshold value, determining, by the controller, whether a temperature of an aftertreatment system is greater than a threshold temperature; and in response to determining that the temperature of the aftertreatment system is greater than the threshold temperature, disabling or partially disabling, by the controller, a heater coupled to the aftertreatment system.

Still another embodiment relates to an apparatus. The apparatus may be configured to decrease an amount of harmful engine exhaust emissions. The apparatus includes a processing circuit including at least one memory having computer-executable instructions stored thereon that is coupled to at least one processor. The computer-executable instructions, when executed by at least one processor, causes the processing circuit to perform operations including: determining whether an engine system is idling; in response to determining that the engine system is idling, determining whether a conversion efficiency of the engine system is greater than a threshold value; in response to determining that the conversion efficiency is greater than the threshold value, determining whether a temperature of an aftertreatment system coupled to the engine system is greater than a threshold temperature; and in response to determining that the temperature of the aftertreatment system is greater than the threshold temperature, disabling or partially disabling a heater coupled to the aftertreatment system.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure.

One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations.

DETAILED DESCRIPTION

Figure 1:
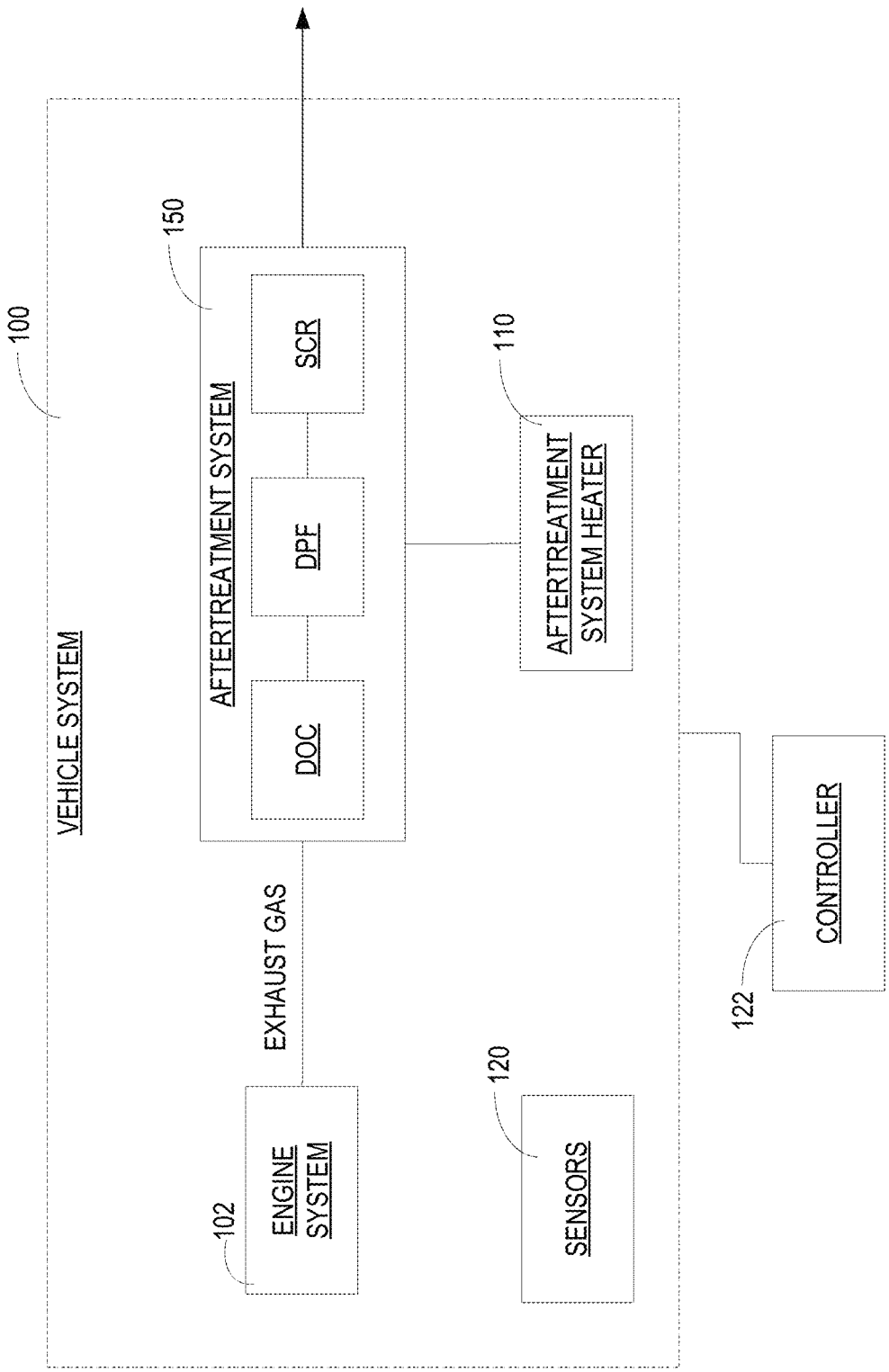
FIG. 1 is an illustration of a controller coupled to a vehicle system, according to an exemplary embodiment.

Following below are more detailed descriptions of methods, apparatuses, and systems for reducing harmful emissions from an engine. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

During engine operation, various harmful emissions are released into the environment via the exhaust gas from the engine. Many vehicles include an aftertreatment system configured to reduce the amount of these emissions. An aftertreatment system can include one or more of a selective catalytic reduction ("SCR") system, a diesel oxidation catalyst ("DOC"), and a diesel particulate filter ("DPF"). An SCR system converts nitrogen oxides (NOx) into nitrogen and water, thereby reducing the amount of NOx released to the environment. A DOC converts hydrocarbons and carbon monoxide into carbon dioxide and water, thereby reducing the amount of hydrocarbons and carbon monoxide released to the environment. SCR systems and DOCs are most effective when the catalyst bed temperature is at or above a threshold temperature (e.g., approximately 200° Celsius ("C")). Higher exhaust gas temperatures heat the catalysts of the SCR system and the DOC to promote catalyst activity, which results in intended operation of these catalysts to reduce harmful emissions from the engine. A DPF is configured to capture particulate matter, thereby reducing the amount of particulate matter (e.g., soot, etc.) released to the environment. Because the DPF captures particulate matter, the DPF should be cleaned on a routine basis to avoid clogging. Typically, cleaning the DPF requires increasing the temperature of the exhaust gas to at least 450° C. to burn the accumulated particulate matter.

In some instances, a heater is used to heat one or more components of the aftertreatment system (e.g., the DOC, SCR, DPF) to facilitate the functionality of the aftertreatment system. When the engine system is under load and producing harmful emissions, the heater functions to maintain the components of the aftertreatment system at a temperature suitable to react with the harmful emissions to reduce those emissions. However, when the engine system is not under load (e.g., when the engine system is idling), the engine produces little to no harmful emissions. Operating the heater in instances when the engine system is idling increases carbon dioxide ($CO_2$) emissions even when the engine system is producing little to no harmful emissions. According to the present disclosure, methods, apparatuses, and systems are disclosed that manage operation of an aftertreatment system heater to reduce harmful emissions.

Aftertreatment system heaters can be added to a conventional aftertreatment system. An aftertreatment system heater is configured to increase the temperature of the exhaust gas, aftertreatment system components (e.g., catalyst), and/or a combination thereof to either 1) raise the temperature of the exhaust gas to a threshold temperature to promote catalyst activity in the aftertreatment system, or 2) further elevate the temperature of the exhaust gas to increase the effectiveness of the aftertreatment system. A variety of heaters may be present in an aftertreatment system, placed upstream of different catalyst elements (e.g., the DOC, SCR, etc.) or embedded in the catalyst elements themselves. The aftertreatment system heater(s) may be powered from the engine via a generator (e.g., a motor-generator) or may draw power from a battery or any other energy storage system if one is present. The battery may replenish itself using engine power or draw power from an external electrical source. In almost all of these cases, providing power to the aftertreatment system heater tends to alter engine operation (e.g., greater fuel consumption, higher amounts of $NO_x$ being released, etc.) as compared to when power is not provided to the aftertreatment system heater (e.g., the aftertreatment system heater is not operating).

According to the present disclosure and as described in more detail herein, a system and method of operating an aftertreatment system heater based on various operating conditions of the engine system is disclosed to mitigate certain exhaust gas emissions. A controller is coupled to an aftertreatment system heater, the engine, and other components of the system. In operation, the controller utilizes sensors to determine or estimate 1) whether the engine system is idling, 2) whether a conversion efficiency of the engine system is greater than a threshold value, and 3) whether a temperature of the aftertreatment system is greater than a threshold temperature, to determine whether to disable an aftertreatment system heater to decrease harmful emissions. As used herein, the term "conversion efficiency" refers to a ratio of the $NO_x$ emissions at an outlet of the aftertreatment system (e.g., an outlet of the SCR) relative to the $NO_x$ emissions at an outlet of the engine system. In various embodiments, the conversion efficiency is conveyed as a percentage. Other values in place of or in addition to a percentage may also be used to reflect/be an indication of the reduction of $NO_x$ emissions achieved by the aftertreatment system, or a component thereof, relative to an engine out $NO_x$ amount. As an example calculation, if the $NO_x$ emissions at the outlet of the SCR is 35 parts per million ("ppm") and the $NO_x$ emissions at the outlet of the engine system is 50 ppm, the conversion efficiency achieved by the SCR is 70% (e.g., (35/50)*100).

It should be understood that while the description and Figures herein are primarily directed to systems and methods to reduce emissions by operating various systems within a vehicle, this description is not meant to be limiting. The systems and methods described herein are also applicable to accomplish other effects within a vehicle.

Referring now to FIG. 1, an illustration of a controller 122 coupled to a vehicle system 100 is shown, according to an exemplary embodiment. The vehicle system 100 may be included in a vehicle. The vehicle may include an on-road or an off-road vehicle including, but not limited to, line-haul trucks, mid-range trucks (e.g., pick-up trucks), cars, boats, tanks, airplanes, locomotives, mining equipment, and any other type of vehicle that may utilize systems to reduce emissions. The vehicle may include a powertrain system, a fueling system, an operator input/output device, one or more additional vehicle subsystems, etc. The vehicle may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset. The vehicle system 100 is shown to include the engine system 102, an aftertreatment system 150 coupled to the engine system 102, an aftertreatment system heater 110 coupled to the aftertreatment system 150, and sensors 120.

In the example shown, the engine system 102 is structured as a compression-ignition internal combustion engine system that utilizes diesel fuel. However, in various alternate embodiments, the engine system 102 may be structured as any other type of internal combustion engine system (e.g., spark-ignition) that utilizes any type of fuel (e.g., gasoline, natural gas). In still other example embodiments, the engine system 102 may be or include an electric motor (e.g., a hybrid drivetrain). The engine system 102 includes one or more cylinders and associated pistons. Air from the atmosphere is combined with fuel, and combusted, to power the engine system 102. Combustion of the fuel and air in the compression chambers of the engine system 102 produces exhaust gas that is operatively vented to an exhaust pipe and to the aftertreatment system.

The aftertreatment system 150 is structured to receive exhaust gas from the engine system 102 and remove/mitigate harmful emissions from the exhaust gas before the exhaust gas is expelled to the environment. The aftertreatment system 150 may include one or more of a DOC, a DPF, and a SCR, the functions of which are described above.

The aftertreatment system heater 110 is coupled to the aftertreatment system 150 and is configured to either 1) increase the temperature of the exhaust gas flowing through the aftertreatment system 150, or 2) increase the temperature of one or more components of the aftertreatment system 150. Raising the temperature of the exhaust gas and/or the aftertreatment system 150 with the aftertreatment system heater 110 may increase the efficiency of one or more catalysts of the aftertreatment system 150. The aftertreatment system heater 110 may be a grid heater, a heater within the SCR system, an induction heater, or a microwave heater.

A grid heater may include an electrically conductive mesh structure configured to fit within the flow of the exhaust gas that allows the exhaust gas to flow through the mesh structure. The mesh structure can be, for example, a resistive heater that increases in temperature when coupled to an electric power source. The grid heater heats the gas, which in turn transfers heat to a catalyst of the aftertreatment system 150. As the exhaust gas flows through the grid heater, the temperature of the exhaust gas increases via convection.

A heater within the SCR system may include an electric heater embedded within, or otherwise coupled to, the catalyst substrate. The electric heater may be a resistive heater or any other type of suitable electric heater capable of heating the exhaust gas as it flows through the SCR system.

An induction heater may include an electrically conductive structure configured to fit within the flow of the exhaust gas that allows the exhaust gas to flow through or around the structure. The structure is coupled to an electromagnet connected to a power source. The power source induces a high-frequency alternating current through the electromagnet, which generates current through the structure, causing the structure to heat up. As exhaust gas flows through the structure, the temperature of the exhaust gas increases via convection.

A microwave heater may include an electromagnetic radiation source in communication with the exhaust gas. The electromagnetic radiation source may rapidly vary electric and magnetic fields, causing the exhaust gas to increase in temperature.

In some instances, operation of the aftertreatment system heater 110 requires an additional load to be placed on the engine system 102 to provide enough power to operate the aftertreatment system heater 110. The additional load on the engine system 102 causes the engine system to produce additional harmful emissions (e.g., carbon dioxide ($CO_2$)) that it would not have produced if the aftertreatment system heater 110 were disabled (i.e., turned off).

The sensors 120 are coupled to the controller 122 and to one or more of the systems of the vehicle system 100 (or of other systems/components of the associated vehicle). The sensors are configured to detect and/or determine values associated with various properties of the vehicle system 100 and vehicle. Accordingly, the sensors 120 may include one or more of a temperature sensor (e.g., a thermocouple, a resistance temperature detector, etc., to determine a temperature of the exhaust gas), a particulate matter sensor (e.g., to determine the amount of particulate matter in the exhaust gas), an emission sensor (e.g., to determine a proportion of oxygen and nitrous oxides in the exhaust gas, which is indicative of the level of harmful emissions in the exhaust gas and thus the efficiency of the engine), a vibration sensor, a noise sensor, an engine speed sensor, a vehicle speed sensor, an engine torque sensor, sensors for the fueling system (e.g., to track a fuel injected quantity, a rail pressure, etc.), and so on. In some embodiments, certain of the sensors 120 are combined into a single sensor. In some embodiments, the sensors 120 are separate sensors. In some embodiments, a plurality of sensors (e.g., a plurality of temperature sensors, a plurality of particulate matter sensors, and/or a plurality of emission sensors) may be used.

The controller 122 is coupled to the systems/components of the vehicle system 100 and is configured to at least partly control the operation of the vehicle system 100 and associated vehicle. The controller 122 is further described with reference to FIG. 2.

When the engine system 102 is required to do work to facilitate movement of the vehicle system 100, the engine system 102 may produce harmful emissions resulting from combustion of fuel. The harmful emissions are reduced by the aftertreatment system 150 and the efficiency of the aftertreatment system 150 may be increased by operation of the aftertreatment system heater 110. However, when the engine system 102 is not required to do work to facilitate movement of the vehicle system 100 (e.g., when the engine system 102 is idling), no or few combustion events may occur (such as in an idle mode of operation), and therefore no or little harmful emissions are produced. In such instances, it may be beneficial to disable operation of the aftertreatment system heater 110 to prevent the engine system 102 from producing $CO_2$, as long as the conversion efficiency of the engine system 102 is above a threshold value and the temperature of the aftertreatment system 150 is greater than a threshold temperature. In some embodiments the threshold value may be any number greater than or equal to 90% (e.g., 93%, 95%, 99%, etc.). In some arrangements, the threshold temperature is approximately 200° C. (e.g., plus-or-minus 10° C.). However, as described below, the threshold temperature may change based on the age of the engine system 102. In instances where at least one of certain conditions presented (e.g., engine system 102 idling, conversion efficiency of the engine system 102 greater than a threshold value, and temperature of the aftertreatment system 150 greater than a threshold value) is not met, disabling the aftertreatment system heater 110 may result in higher harmful emissions released to the environment as compared to maintaining the aftertreatment system heater 110 in an operational state.

Figure 2:
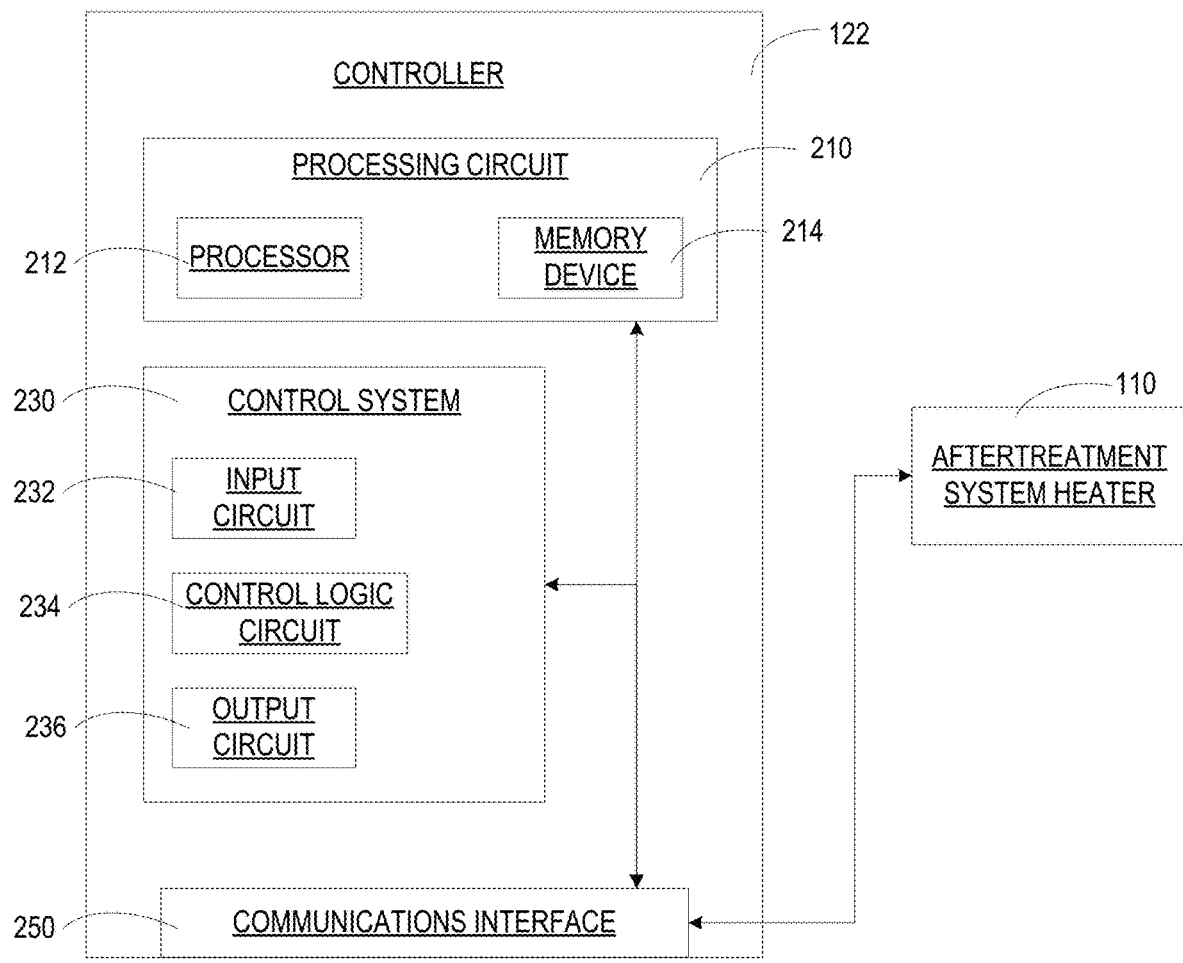
FIG. 2 is a schematic diagram of the controller of FIG. 1, according to an exemplary embodiment.

FIG. 2 is a schematic diagram of the controller 122 of FIG. 1, according to an exemplary embodiment. The controller 122 is structured to receive inputs (e.g., signals, information, data, etc.) from the vehicle system 100 components/systems. Thus, the controller 122 is structured to control, at least partly, the vehicle system components/systems and associated vehicle. As the components of FIG. 2 can be embodied in a vehicle, the controller 122 may be structured as one or more electronic control units (ECU). The controller 122 may be separate from or included with at least one of a transmission control unit, an exhaust aftertreatment control unit, a powertrain control module, an engine control module, etc.

As shown, the controller 122 includes a processing circuit 210 having a processor 212 and a memory device 214, a control system 230 having an input circuit 232, a control logic circuit 234, an output circuit 236, and a communications interface 250.

In one configuration, the input circuit 232, the control logic circuit 234, and the output circuit 236 are embodied as machine or computer-readable media that stores instructions that are executable by a processor, such as processor 212, and stored in a memory device, such as memory device 214. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the input circuit 232, the control logic circuit 234, and the output circuit 236 are embodied as hardware units, such as electronic control units. As such, the input circuit 232, the control logic circuit 234, and the output circuit 236 may be embodied as one or more circuitry components including, but not limited to, processing circuitry, network interfaces, peripheral devices, input devices, output devices, sensors, etc. In some embodiments, the input circuit 232, the control logic circuit 234, and the output circuit 236 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the input circuit 232, the control logic circuit 234, and the output circuit 236 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The input circuit 232, the control logic circuit 234, and the output circuit 236 may also include programmable hardware devices such as field programmable gate arrays, programmable array logic, programmable logic devices or the like.

The input circuit 232, the control logic circuit 234, and the output circuit 236 may include one or more memory devices for storing instructions that are executable by the processor(s) of the input circuit 232, the control logic circuit 234, and the output circuit 236. The one or more memory devices and processor(s) may have the same definition as provided below with respect to the memory device 214 and processor 212. In some hardware unit configurations, the input circuit 232, the control logic circuit 234, and the output circuit 236 may be geographically dispersed throughout separate locations in, for example, a vehicle. Alternatively and as shown, the input circuit 232, the control logic circuit 234, and the output circuit 236 may be embodied in or within a single unit/housing, which is shown as the controller 122.

In the example shown, the controller 122 includes the processing circuit 210 having the processor 212 and the memory device 214. The processing circuit 210 may be structured or configured to execute or implement the instructions, commands, and/or control processes described herein with respect to the input circuit 232, the control logic circuit 234, and the output circuit 236. The depicted configuration represents the input circuit 232, the control logic circuit 234, and the output circuit 236 as machine or computer-readable media that stores instructions. In some embodiments, the instructions may be stored by the memory device. However, as mentioned above, this illustration is not meant to be limiting as the present disclosure contemplates other embodiments where the input circuit 232, the control logic circuit 234, and the output circuit 236, or at least one circuit of the input circuit 232, the control logic circuit 234, and the output circuit 236, is configured as a hardware unit. All such combinations and variations are intended to fall within the scope of the present disclosure.

The processor 212 may be a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Accordingly, the processor 212 may be a microprocessor, a different type of processor, or state machine. The processor 212 also may be implemented as a combination of computing devices, such as a combination of a DSP and a microprocessor, a plurality of microprocessors, one or more microprocessors in conjunction with a DSP core, or any other such configuration. In some embodiments, the processor 212 may two or more processors that may be shared by multiple circuits (e.g., the input circuit 232, the control logic circuit 234, and the output circuit 236 may comprise or otherwise share the same processor which, in some example embodiments, may execute instructions stored, or otherwise accessed, via different areas of memory). Alternatively or additionally, the processors may be structured to perform or otherwise execute certain operations independent of the other co-processors. In other example embodiments, the processors may be coupled via a bus to enable independent, parallel, pipelined, or multi-threaded instruction execution. All such variations are intended to fall within the scope of the present disclosure.

The memory device 214 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 214 may be coupled to the processor 212 to provide computer code or instructions to the processor 212 for executing at least some of the processes described herein. Moreover, the memory device 214 may be or include tangible, non-transient volatile memory or non-volatile memory. Accordingly, the memory device 214 may include database components, object code components, script components, or any other type of information structure for supporting the various activities and information structures described herein.

The communications interface 250 is structured to receive communications from and provide communications to vehicle system 100 components/systems and, in some embodiments, to remote entities/operators (e.g., outside of the vehicle). The communications interface 250 is structured to exchange data, communications, instructions, and the like with an input/output device (e.g., via input circuit 232) of the vehicle system 100. In some arrangements, the communications interface 250 includes communication circuitry for facilitating the exchange of data, values, messages, etc. between the communications interface 250 and the components of a remote computing system as well as the components/systems of the vehicle. In some arrangements, the communications interface 250 includes machine-readable media for facilitating the exchange of information between the communications interface 250 and the components of a remote computing system as well as the components/systems of the vehicle. In some arrangements, the communications interface 250 includes any combination of hardware components, communication circuitry, and machine-readable media.

In some embodiments, the communications interface 250 includes a network interface. The network interface is used to establish connections with other computing devices by way of a network. The network interface includes program logic that facilitates connection of a remote computing system 110 (e.g., a fleet operator computing system, a remote attendant, etc.) to the network. In some arrangements, the network interface includes any combination of a wireless network transceiver (e.g., a cellular modem, a Bluetooth transceiver, a Wi-Fi transceiver) and/or a wired network transceiver (e.g., an Ethernet transceiver). For example, the communications interface 250 includes an Ethernet device such as an Ethernet card and machine-readable media such as an Ethernet driver configured to facilitate connections with the network. In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted. In an example embodiment, the communications interface 250 is structured to receive information from other vehicles.

The input circuit 232 is structured to receive and exchange information with an operator of the vehicle. Accordingly, the input circuit 232 may be coupled to an operator input/output device. The operator input/output device may include, but is not limited to, an interactive display, a touchscreen device, one or more buttons and switches, voice command receivers, etc. In this way, the operator input/output device may provide one or more indications or notifications to an operator, such as a malfunction indicator lamp (MIL), etc. Via the input/output device, the operator may define one or more thresholds, parameters indicative of idling (e.g., an engine revolutions-per-minute value for a predefined amount of time, etc.), desired emissions values (e.g., a desired conversion efficiency), and so on. These inputs may be used by the controller 122 herein to control operation of the heater 110 during various situations. In some other embodiments and via the communications interface 250, a remote operator/attendant (e.g., fleet operator) may set one or more of the aforementioned parameters. This information may be pushed to the vehicle and controller 122 during an over-the-air update or at other periodic times.

Information provided, acquired, and/or generated by the components/systems of the vehicle system 100 is sent to the control logic circuit 234 wirelessly (e.g., the sensors include a wireless transmitter to transmit information and the control logic circuit 234 includes a wireless receiver to receive the information). The information provided by the components/systems of the vehicle system 100 can also be sent to the control logic circuit 234 via a wired connection (e.g., coaxial cable, wires, etc.). The input circuit 232 may modify or format the information (e.g., via analog/digital converter) so that the sensor information can be readily used by the control logic circuit 234. In some embodiments, the sensor information may include the temperature of the exhaust gas and/or one or more components of the aftertreatment system 150 (e.g., the DOC, DPF, and/or SCR). In some embodiments, the sensor information may include an amount of particulate matter and/or emissions present in the exhaust gas at the outlet of the engine system 102. In some embodiments, the sensor information may include an amount of particulate matter and/or emissions present in the exhaust gas at the outlet of the aftertreatment system 150. In some embodiments, the sensor information may include an indication of a status of the engine system 102 (e.g., idling, under load, etc.).

The control logic circuit 234 is structured to receive information regarding the components/systems of the vehicle system 100 (e.g., sensor information) and from the input circuit 232 and to determine one or more operation strategies based on the information. For example, the control logic circuit 234 can determine whether the aftertreatment system heater 110 should be disabled to reduce the amount of harmful emissions released into the environment. As used herein, "control parameters" refer to values or information determined within the control logic circuit 234 by the embedded control logic, model, algorithm, or other control scheme. The control parameters may include values or other information that represents a status or a state of a vehicle system, a predictive state information, or any other values or information used by the control logic circuit 234 to determine what the controller 122 should do or what the outputs should be for controlling one or more components and/or systems of the vehicle.

For an aftertreatment system heater (e.g., the aftertreatment system heater 110), a complex control scheme balances requirements to 1) meet a requested exhaust gas temperature within a specified duration (e.g., catalyst warmup), 2) maintain engine out emissions and fuel consumption at acceptable levels during cold starts, and 3) maintain engine performance at a suitable efficiency based on an engine load. In order to control the technology to meet these requirements, "control parameters" are utilized to monitor the current state of the components. Control parameters can include engine operating conditions (e.g., engine load, fuel efficiency, power consumption, etc.) and/or aftertreatment system heater operating conditions (e.g., temperature of exhaust gas, power consumption, etc.).

In some embodiments, the control logic circuit 234 includes algorithms or traditional control logic (e.g., PIDs, etc.). In some embodiments, the control logic circuit 234 includes modeling architecture for component integration or other model based logic (e.g., physical modeling systems that utilize lookup tables). In some embodiments, the control logic circuit 234 utilizes one or more lookup tables stored in the memory device 214 for determination of the control parameters. In some embodiments, the control logic circuit 234 may include artificial intelligence or machine learning circuits, or fuzzy logic circuits, as desired. In one embodiment, the control logic circuit 234 may receive a request related to decreasing harmful emissions released to the environment (e.g., from the input circuit 232), and determine a control parameter in the form of disabling an aftertreatment system heater (e.g., the aftertreatment system heater 110).

The output circuit 236 is structured to receive the control parameters from the control logic circuit 234 and provide power information (e.g., the "output") to the components/systems of the vehicle system 100 via the communications interface 250. In some embodiments, the output circuit 236 receives a threshold exhaust gas temperature from the control logic circuit 234 and/or input circuit 232 and outputs a signal to disable the aftertreatment system heater 110 if the actual (or estimated, if a direct measurement at a desired location is not feasible) exhaust gas temperature is greater than the threshold exhaust gas temperature. In some embodiments, the output circuit 236 receives a threshold conversion efficiency value from the control logic circuit 234 and outputs a signal to disable the aftertreatment system heater 110 if the actual conversion efficiency value is greater than the threshold value.

According to various embodiments, the temperature of the exhaust gas and/or the aftertreatment system 150 may be determined by direct measurement or by proxy based on various operating parameters of the vehicle 100. To measure the temperature of the exhaust gas via direct measurement, one or more of the sensors 120 (e.g., thermocouples, etc.) coupled to the controller 122 may be placed in, on, or near the flow of the exhaust gas. Locations of the one or more sensors 120 can include, but are not limited to, at the inlet and/or outlet of the SCR, at the inlet and/or outlet of the DPF, at the inlet and/or outlet of the DOC, and any other location that may provide the ability to directly measure the temperature of the exhaust gas. To determine or predict the temperature of the exhaust gas, the temperature of the exhaust gas may be estimated or determined by the controller 122 based on operating parameters such as the engine speed, the engine torque, and any other parameters associated with the engine system that may indicate the temperature of the exhaust gas (e.g., via one or more look-up tables, algorithms, etc. that correlate one or more operating parameters to exhaust gas temperature).

According to various embodiments, the level of emissions in the exhaust gas may be determined by direct measurement. To measure the level of emissions in the exhaust gas via direct measurement, one or more of the sensors 120 (e.g., particulate matter sensors, etc.) coupled to the controller 122 may be placed in, on, or near the flow of the exhaust gas. For example, a sensor 120 may be positioned at the outlet of the engine system 102 and another sensor 120 may be positioned at the outlet of the aftertreatment system 150. In some instances, a sensor 120 may be positioned at an outlet of the SCR within the aftertreatment system 150. The controller 122 may use this information to determine a conversion efficiency of the engine system 102. In some embodiments, the conversion efficiency of the engine system 102 is determined by the controller 122 based on the information provided by the sensors 120 (or other information).

Figure 3:
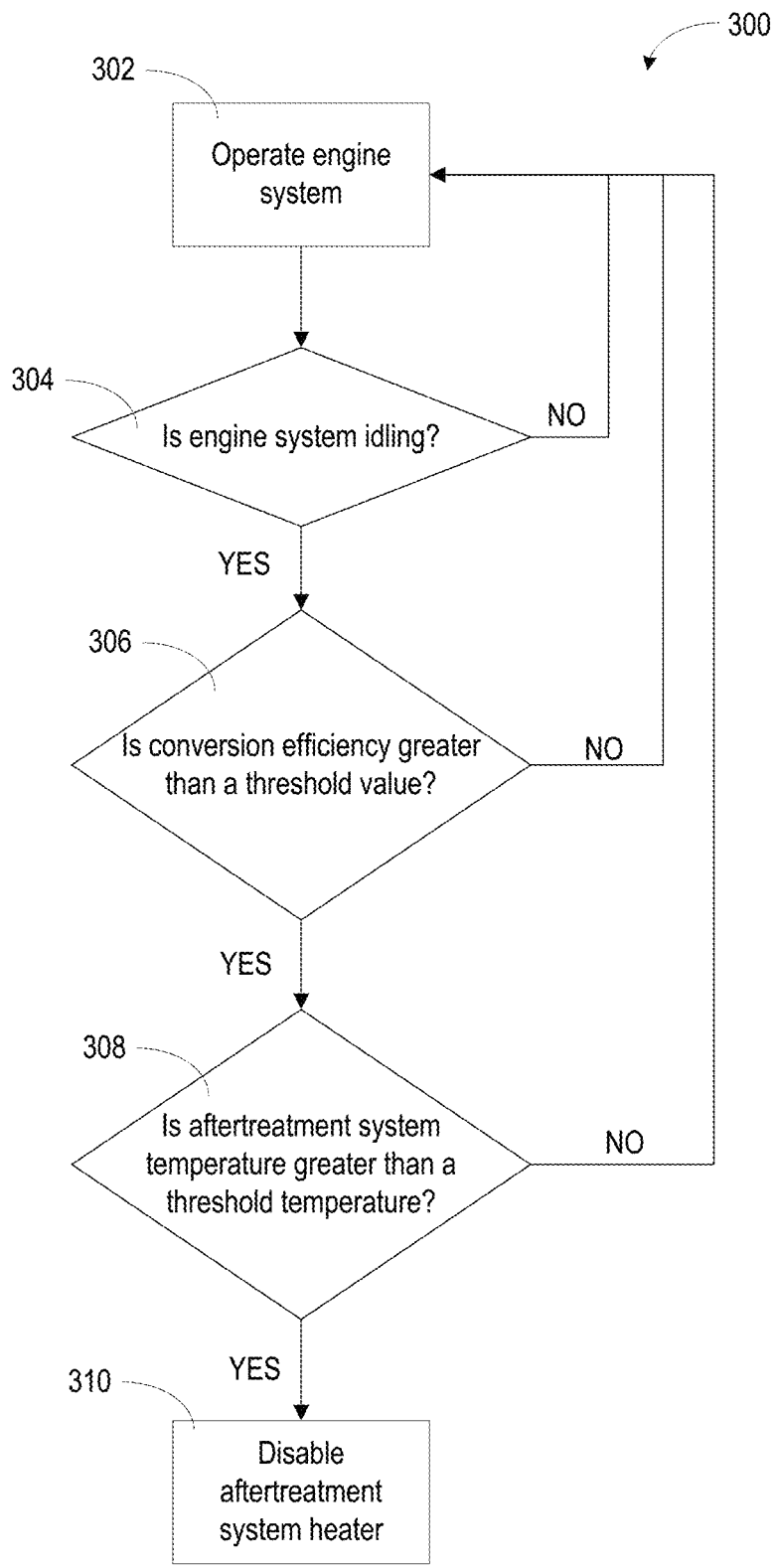
FIG. 3 is a flow diagram of a method to reduce emissions from an engine system, according to an exemplary embodiment.

Referring now to FIG. 3, a flow diagram of a method 300 to reduce emissions from the engine system 102 is shown, according to an exemplary embodiment. The method 300 may be implemented, at least in part, by the controller 122 such that reference is made to the controller 122 to aid in explanation of the method 300.

At process 302, the engine system 102 is operated. For example, a driver may be within the vehicle and operating the engine system 102 (e.g., pressing an accelerator pedal to cause the vehicle to move, shifting a transmission gear, pressing a brake to cause the vehicle to stop, etc.) such that the vehicle moves from an origin to a destination.

At process 304, a determination is made, by the controller 122, as to whether the engine system 102 is idling. As used herein, the term "idling" refers to the engine (e.g., the engine system 102) running while a vehicle (e.g., the vehicle system 100) is stopped for an extended period. As used herein, an "extended period" is a duration longer than a threshold duration. In one embodiment, the threshold duration is a predefined amount of time. In another embodiment, the threshold duration is an average duration during which a vehicle stops at a stop sign or a red light (for example, one second, two seconds, etc.). The controller 122 may track vehicle stops at a stop sign or red light to identify an average length of a stop to then associate this stop time (in conjunction with the vehicle not moving or moving a minimal amount) with being an idle time. As another example, the controller 122 may determine whether the engine system 102 is idling based on one or more engine parameters such as revolutions per minute ("rpm") of the engine system 102. When an engine system such as the engine system 102 is idling, the rpm of the engine system is at a minimum (at or below a threshold value). If the rpm of the engine system 102 is either 1) not below the threshold value, or 2) not at the threshold value for an extended period of time (e.g., greater than a predefined amount, such as ten seconds), the controller 122 determines that the engine system 102 is not idling, and the method 300 returns to process 302. If the rpm of the engine system is at or below the threshold value for an extended period, the controller 122 determines that the engine system 102 is idling (for example, the vehicle is stopped at a red light, etc.), and the method 300 proceeds to process 306.

In another embodiment, the controller 122 may determine whether the engine system 102 is idling based on a flow rate of the exhaust gas. For example, when an engine system such as the engine system 102 is idling, the flow rate of the exhaust gas is at a relatively lower flow rate (e.g., below a predefined low flow rate threshold). As a load is applied to the engine system 102 (e.g., a request for power is made by a driver stepping on the accelerator pedal), the flow rate of exhaust gas increases. Accordingly, if the flow rate of the exhaust gas is either 1) above a threshold flow rate value, or 2) above the threshold flow rate for an extended period of time, the controller 122 determines that the engine system 102 is not idling, and the method 300 returns to process 302. If the flow rate of the exhaust is below the threshold flow rate for the extended period (i.e., a predefined amount of time), the controller 122 determines that the engine system 102 is idling, and the method 300 proceeds to process 306.

At process 306, a determination is made, by the controller 122, as to whether a conversion efficiency of the engine system 102 is greater than a predefined threshold value. For example, the controller 122 receives indications of the level of harmful emissions at the outlet of the engine system 102 and the aftertreatment system 150 from the sensors 120. The controller 122 then determines the conversion efficiency of the engine system 102 as described above, and compares the conversion efficiency of the engine system 102 to the predefined threshold value. In some embodiments, the conversion efficiency is determined discretely (e.g., at a single point in time). In some embodiments, the conversion efficiency is determined continuously (e.g., a rolling average). In some embodiments, the conversion efficiency is determined continuously, the conversion efficiency may be filtered using a moving average filter. If the controller 122 determines that the conversion efficiency of the engine system 102 is less than the predefined threshold value, the method 300 returns to process 302. If the controller 122 determines that the conversion efficiency of the engine 102 is greater than the predefined threshold value, the method 300 proceeds to process 308.

In some embodiments, the data corresponding to the conversion efficiency that is received by the controller 122 may need to be filtered to isolate the conversion efficiency data from other data (e.g., noise) that may be included with the conversion efficiency data. By filtering the data prior to the data being received by the controller 122, the controller 122 may be able to make a determination regarding the operation of the aftertreatment system heater 110 earlier than if the data included the noise. Accordingly, the controller may be able to reduce the time required to change the operation of the aftertreatment system heater 110 from enable to disable and from disable to enable.

At step 308, a determination is made, by the controller 122, as to whether a temperature of the aftertreatment system 150 is greater than a predefined threshold temperature. For example, the controller 122 receives an indication of the temperature of the aftertreatment system 150 from one or more sensors 120 (or estimates the temperature via a virtual sensor such that a direct measurement is not made/utilized). The temperature of the aftertreatment system 150 may include the temperature of the exhaust gas flowing through the aftertreatment system 150 and/or the temperature of one or more of the components of the aftertreatment system 150 (e.g., DOC, DPF, SCR). In some embodiments, the threshold temperature is based on an age of the aftertreatment system 150. For example, the age of the aftertreatment system may be determined based on the number of miles driven by the engine system 102. The age of the aftertreatment system 150 may also be determined by the amount of time (e.g., minutes, hours, etc.) during which the aftertreatment system 150 has operated above an operation temperature (e.g., 200° C.) or within a certain temperature range (e.g., 200° C.-300° C.). In some embodiments, as the aftertreatment system 150 increases in age, the temperature at which the aftertreatment system 150 operates efficiently may increase. More specifically, when the aftertreatment system 150 is young (e.g., less than 1,000 miles driven, less than 100 hours in operation above an operation temperature, etc.), the aftertreatment system 150 may efficiently remove harmful emissions at temperatures as low as a low temperature amount (e.g., 180° C.). However, when the aftertreatment system 150 is old (e.g., greater than 100,000 miles driven, greater than 1,000 hours in operation above an operation temperature, etc.), the aftertreatment system may need to be at an elevated temperature (e.g., 230° C.-240° C.) to operate efficiently (i.e., as desired). In various embodiments, the controller 122 may determine the appropriate threshold temperature based on the age of the aftertreatment system 150, and the controller 122 compares the temperature of the aftertreatment system 150 to the appropriate threshold temperature. If the controller 122 determines that the temperature of the aftertreatment system 150 is less than the threshold temperature, then the method 300 returns to process 302. If the controller 122 determines that the temperature of the aftertreatment system 150 is greater than the threshold temperature, the method 300 proceeds to process 310.

At process 310, the controller 122 disables the aftertreatment system heater 110. Disabling, as used herein with respect to the heater 110, refers to disabling power output (i.e., heat) from the heater 110. In other alternate embodiments, the disabling may be a partial disabling and, in turn, refer to reducing the power output by a predefined amount (e.g., fifty-percent relative to a current power output) or operating the power output at a predefined level (e.g., five percent power output). Partial disablement may be commanded by the controller 122 if the controller 122, for example, utilizes look ahead information (e.g., upcoming information regarding the environment of the vehicle, such as a road grade, an ambient temperature, etc.). For example, the controller 122 may receive weather information indicating that the ambient temperature is below a threshold temperature (e.g., below a freezing temperature) and in turn partially disable the heater 110 as compared to completely disabling it so to maintain catalyst temperatures for, e.g., NOx conversion efficiency purposes. As described and beneficially, disabling the aftertreatment system heater 110 when the above requirements are met reduces the amount of $CO_2$ released into the environment by the engine system 102.

Figure 4:
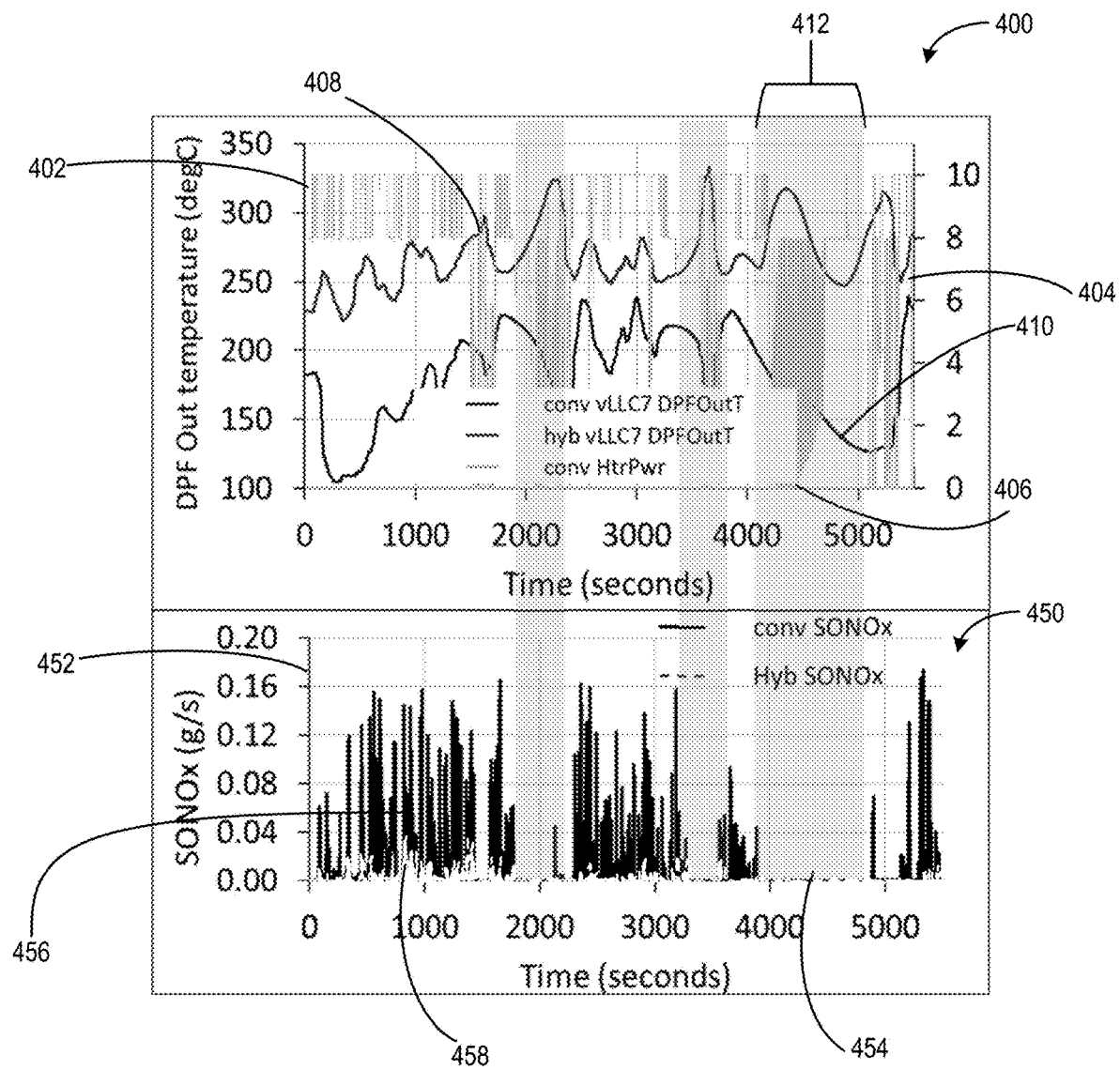
FIG. 4 is an illustration of a first chart and a second chart that depict an example implementation of the method of FIG. 3, according to an exemplary embodiment.

FIG. 4 is an illustration of a first chart 400 and a second chart 450 that depict an example implementation of the method of FIG. 3.

As shown, the first chart 400 includes a y-axis 402, a y-axis 404, an x-axis 406, a first curve 408, a second curve 410, and an idle period 412. The second chart 450 includes a y-axis 452 and an x-axis 454. The y-axis 402 corresponds to a temperature (in degrees Celsius) of an outlet of a DPF of an engine system (e.g., the engine system 102). Though the outlet DPF temperature is shown in FIG. 4, one of skill in the art would understand that the temperature at other portions of an aftertreatment system (e.g., SCR outlet, DOC outlet, etc.) may also be used. The y-axis 404 corresponds to a power supplied to a heater (e.g., the aftertreatment system heater 110) in kilowatts (kW). The x-axis 406 corresponds to time (in seconds). The first curve 408 shows the operation of an engine system that does not include a heater. The second curve 410 shows the operation of an engine system that has a heater but does not implement the method 300 (e.g., does not disable the heater under certain conditions). The y-axis 452 corresponds to an amount of harmful emissions (e.g., sulfur oxide and nitrous oxide, known as $SONO_x$) expelled from the engine system (in grams per second), and the x-axis 454 corresponds to time with the same scale as the x-axis 406.

The idle period 412 indicates that the engine system is idling. As shown, the idle period 412 occurs between approximately 4,000 seconds and approximately 5,000 seconds. The second chart 450 indicates that, because the engine system is idling, the amount of harmful emissions released into the environment from the engine system is negligible. Referring back to the first chart 400, the second curve 410 shows the DPF temperature of a vehicle without the use of the heater while the first curve 408 shows the DPF temperature of a vehicle with the use of the heater. As discussed above, the use of a heater with the aftertreatment system increases the conversion efficiency thereby decreasing the $SONO_x$ of the vehicle. This is illustrated in the second graph 450 where the $SONO_x$ 456 of the vehicle associated with the second curve 410 are higher than the SONO$_x$ 458 of the vehicle associated with the first curve 408.

As discussed above, providing power to the heater puts a load on the engine system, which produces $CO_2$. Accordingly, the first curve 408 indicates that, even during a period (e.g., idle period 412) when the engine system is not producing harmful emissions related to engine operation, the engine system is still producing harmful emissions based on, at least in part, the heater operation. In contrast, the second curve 410 shows that, during the idle period 412, the heater is disabled, thereby allowing the temperature of the aftertreatment system to decrease. As can be seen at the idle period 412, regardless of whether the heater is enabled as shown on the first curve 408 or not as shown on the second curve 410, the SONO$_x$ emissions during the idle period 412 are negligible. Therefore, it may be inferred that enabling the heater during the idle period 412 does not provide any added benefit as it does during non-idle periods. Rather, disabling the heater during the idle period 412 is beneficial to mitigating emissions from the engine system. As described, disabling the heater reduces or eliminates the load on the engine system related to the heater, and the engine system produces little to no $CO_2$. Accordingly, operating an engine system according to the method 300 reduces the amount of $CO_2$ released into the atmosphere during an idle period of the engine system.

For the purpose of this disclosure, the term "coupled" means the joining or linking of two members directly or indirectly to one another. Such joining may be stationary or movable in nature. For example, a propeller shaft of an engine "coupled" to a transmission represents a movable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 2 it should be understood that the controller 122 may include any number of circuits for completing the functions described herein. For example, the activities and functionalities of the circuits 232-236 may be combined in multiple circuits or as a single circuit. Additional circuits with additional functionality may also be included. Further, the controller 122 may further control other activity beyond the scope of the present disclosure.

As mentioned above and in one configuration, the "circuits" may be implemented in machine-readable medium for execution by various types of processors, such as the processor 212 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A system for decreasing harmful emissions, the system comprising:
   an aftertreatment system comprising an exhaust conduit that directs exhaust gas from an engine system;
   a heater coupled to the aftertreatment system and configured to provide heat; and
   a controller coupled to the heater, the controller configured to:
      determine whether the engine system is idling;
      in response to determining that the engine system is idling, determine whether a conversion efficiency of the engine system is greater than a threshold value;
      in response to determining that the conversion efficiency is greater than the threshold value, determine whether a temperature regarding the aftertreatment system is greater than a threshold temperature; and
      in response to determining that the temperature of the aftertreatment system is greater than the threshold temperature, at least one of disable or partially disable the heater.

2. The system of claim 1, wherein the controller is configured to disable the heater.

3. The system of claim 1, wherein determining whether the engine system is idling is based on the controller determining that an exhaust gas flow rate is at or below a predefined threshold value for a predefined amount of time.

4. The system of claim 1, wherein the controller is configured to enable the heater in response to determining that the conversion efficiency is less than the threshold value.

5. The system of claim 1, wherein the controller is configured to enable the heater in response to determining that the temperature of the aftertreatment system is lower than the threshold temperature.

6. The system of claim 1, wherein determining whether the engine system is idling is based on the controller determining whether a vehicle associated with the engine system is stopped for a predetermined amount of time.

7. The system of claim 1, wherein the controller partially disables the heater based on upcoming information regarding an environment of the engine system, the upcoming information comprising at least one of an upcoming road grade or an upcoming ambient temperature.

8. A method for decreasing harmful emissions from an engine system, comprising:
   determining, by a controller, whether the engine system is idling;
   in response to determining that the engine system is idling, determining, by the controller, whether a conversion efficiency of the engine system is greater than a threshold value;
   in response to determining that the conversion efficiency is greater than the threshold value, determining, by the controller, whether a temperature of an aftertreatment system is greater than a threshold temperature; and
   in response to determining that the temperature of the aftertreatment system is greater than the threshold temperature, disabling or partially disabling, by the controller, a heater coupled to the aftertreatment system.

9. The method of claim 8, wherein determining whether the engine system is idling comprises determining, by the controller, that an exhaust gas flow rate is at or below a predefined threshold value for a predefined amount of time.

10. The method of claim 8, wherein in response to determining that the conversion efficiency is less than the threshold value, the method further comprises enabling, by the controller, the heater.

11. The method of claim 8, wherein in response to determining that the temperature of the aftertreatment system is less than the threshold temperature, the method further comprises enabling, by the controller, the heater.

12. The method of claim 8, wherein determining whether the engine system is idling comprises determining, by the controller, that a vehicle associated with the engine system is stopped for a predetermined amount of time.

13. The method of claim 8, wherein the method further comprises partially disabling, by the controller, the heater based on upcoming information regarding an environment of the engine system, the upcoming information comprising at least one of an upcoming road grade or an upcoming ambient temperature.

14. An apparatus, comprising:
   a controller having a processing circuit comprising at least one memory having computer-executable instructions stored thereon that is coupled to at least one processor, the computer-executable instructions, when executed by at least one processor, causes the processing circuit to perform operations comprising:
      determining whether an engine system is idling;
      in response to determining that the engine system is idling, determining whether a conversion efficiency of the engine system is greater than a threshold value;
      in response to determining that the conversion efficiency is greater than the threshold value, determining whether a temperature of an aftertreatment system coupled to the engine system is greater than a threshold temperature; and
      in response to determining that the temperature of the aftertreatment system is greater than the threshold temperature, disabling or partially disabling a heater coupled to the aftertreatment system.

15. The apparatus of claim 14, wherein the temperature of the aftertreatment system includes a temperature of exhaust gas flowing through the aftertreatment system or a temperature of one or more of the components of the aftertreatment system.

16. The apparatus of claim 14, wherein the computer-executable instructions, when executed by at least one processor, further cause operations comprising, enabling, by the controller, the heater in response to determining that the conversion efficiency is less than the threshold value.

17. The apparatus of claim 14, wherein the conversion efficiency refers to an amount of NOx emissions at an outlet of the aftertreatment system relative to an amount of NOx emissions at an outlet of the engine system.

18. The apparatus of claim 14, wherein determining whether the engine system is idling comprises determining whether a vehicle associated with the engine system is stopped for a predetermined amount of time.

19. The apparatus of claim 14, wherein the computer-executable instructions, when executed by at least one processor, further cause operations comprising disabling the heater based on based on upcoming information regarding an environment of the engine system, the upcoming information comprising at least one of an upcoming road grade or an upcoming ambient temperature.

20. The apparatus of claim 14, wherein determining whether the engine system is idling is based on determining that an exhaust gas flow rate is at or below a predefined threshold value for a predefined amount of time.

* * * * *